(12) United States Patent
Nelson et al.

(10) Patent No.: US 6,908,275 B2
(45) Date of Patent: Jun. 21, 2005

(54) FASTENER HAVING SUPPLEMENTAL SUPPORT AND RETENTION CAPABILITIES

(76) Inventors: Charles Nelson, 24 Navajo Rd., Manalapan, NJ (US) 07726; Matthew J. Esserman, 1921 Spruce St., Apt. 1F, Philadelphia, PA (US) 19103; James E. Schneider, 6 Camelot Ct., Manalapan, NJ (US) 07726

(*) Notice: Subject to any disclaimer, the term of this patent is extended or adjusted under 35 U.S.C. 154(b) by 0 days.

(21) Appl. No.: 10/134,866

(22) Filed: Apr. 29, 2002

(65) Prior Publication Data

US 2003/0202861 A1 Oct. 30, 2003

(51) Int. Cl.$^7$ ............................................. F16B 15/99
(52) U.S. Cl. .......................... 411/487; 411/2; 411/392; 411/424; 411/901
(58) Field of Search .................... 411/2–5, 424, 411/914, 392, 447, 448, 451.1, 455, 469, 487, 901, 902

(56) References Cited

U.S. PATENT DOCUMENTS

| | | | |
|---|---|---|---|
| 1,428,247 A | | 9/1922 | Morris |
| 1,469,126 A | * | 9/1923 | Thomas .................. 411/392 X |
| 1,828,287 A | * | 10/1931 | MacBean ................ 411/392 X |
| 3,077,809 A | * | 2/1963 | Harding et al. ......... 411/392 X |
| 3,983,779 A | | 10/1976 | Dimas |
| 4,279,190 A | | 7/1981 | Hummel |
| 4,353,673 A | * | 10/1982 | Lesowsky .................... 411/38 |
| 4,637,768 A | | 1/1987 | Rabe |
| 4,696,423 A | | 9/1987 | Ryan |
| 5,061,137 A | * | 10/1991 | Gourd .................... 411/392 X |
| 5,292,215 A | | 3/1994 | Roberts, III |
| 5,509,765 A | * | 4/1996 | Albin ......................... 411/38 |
| 5,564,876 A | | 10/1996 | Lat |
| 5,785,478 A | | 7/1998 | Rotter |
| 5,870,870 A | * | 2/1999 | Utzman .................... 52/483.1 |
| 6,095,737 A | | 8/2000 | Barker et al. |
| 6,309,155 B1 | | 10/2001 | Huang |
| 6,317,937 B1 | | 11/2001 | Ishihara et al. |
| 6,623,492 B1 | * | 9/2003 | Berube et al. ............. 606/151 |

* cited by examiner

*Primary Examiner*—Flemming Saether
(74) *Attorney, Agent, or Firm*—Matthew J. Esserman

(57) ABSTRACT

A fastener, such as a nail, screw, etc., which possesses supplemental support and/or retention capability is provided. The fastener includes an elongated auxiliary member secured interiorly to, exteriorly to, or along the shaft of the fastener. The auxiliary member is secured to the shaft at two or more portions of the shaft. The auxiliary member provides the shaft with additional support strength and/or enables fastened materials to be retained upon breakage or shearing of the shaft as a result of, for example, heavy tensile or shearing loads. To facilitate breakage or shearing of the shaft, the shaft may be provided with a deformation, such as a notch or reduced circumference, at one or more desired locations such that the shaft breaks or shears at the deformation(s), thereby allowing the auxiliary member to function as the sole member which retains the fastened materials. The auxiliary member may be sufficiently flexible and pliable such that, upon breakage or shearing of the shaft, retention of the materials is maintained but in a less stressed form.

99 Claims, 9 Drawing Sheets

US 6,908,275 B2

FASTENER HAVING SUPPLEMENTAL SUPPORT AND RETENTION CAPABILITIES

FIELD OF THE INVENTION

The present invention relates generally to the field of fasteners. In particular, the present invention relates to fasteners which possess supplemental support and retention capabilities. More specifically, the present invention relates to fasteners which possess supplemental support, and which possess retention capabilities upon breakage of the fastener shaft, by utilizing an elongated auxiliary member secured interiorly or exteriorly to the shaft, or along the shaft.

BACKGROUND OF THE INVENTION

In various instances, a fastener, e.g. a nail or screw, has been used to hold a material in place, such as house siding, shingles, sheathing, panels, structural members, etc., or to fasten studs, joists, beams, etc. In most cases, keeping materials fastened together is the sole goal and purpose of the fastener. However, in regions subject to windy conditions and/or earthquakes, these fasteners may fail to perform their sole function which sometimes results in unfortunate consequences. For example, these fasteners, often times, are subject to high tensile and/or shear forces which cause the shaft to break thereby allowing the fastened material to separate during high winds or wind gusts, or during vibrations from an earthquake. When this occurs, the unfastened materials depart from their fastened or intended location and may inflict injury to innocent bystanders or may damage property in its wake.

Thus, it is desirable to provide a fastener which is able to overcome the above disadvantages experienced during adverse atmospheric conditions and/or during vibrations associated with, for example, earthquakes, and yet has sufficient strength so as to maintain adequate fastening ability during all climate and stability conditions.

Alternatively, for fastening together portions of certain highly stressed constructions, such as aircraft or other assemblies requiring high strength and/or light weight, many variations of fasteners have been suggested. For example, many of these prior art fasteners have been made of a core material to which a different material has been applied as a thin protective coating, as by plating, galvanizing, or other application methods. However, in these fasteners, the reduction in weight has caused a corresponding reduction in strength and/or the ability to withstand other tensile or shear forces caused by the stresses to which the assembly may be subjected.

Attempts to overcome the disadvantages of these prior art fasteners have been successful in part but have introduced other shortcomings. Typically, a molded, non-metallic fastener having an external coating of metal provides a lightweight fastener, but is unlikely to have the desired strength to withstand severe tensile and/or shear forces without a significant increase in size. Also, metal coated non-metallic fasteners typically cannot be used in conjunction with metallic structures since the relatively thin metallic coating can be quickly destroyed or worn away by the metallic structures, thereby permitting the assembled structures to act against the more fragile non-metallic core material. Thus, under the high stress conditions in which these fasteners may be used, failures can occur resulting in cutting through or shearing of the non-metallic core.

It is therefore desirable to provide a fastener having supplemental support that can be utilized in critical and/or high-stressed constructions (as well as normal or typical constructions), and that does not suffer from the above drawbacks.

These and other advantages of the present invention will become more fully apparent from the detailed description of the invention hereinbelow.

SUMMARY OF THE INVENTION

The present invention is directed to a fastener comprising a shaft having a first end and a second end, wherein the first end comprises a head. The fastener also comprises an auxiliary member secured to the shaft at at least two portions of the shaft. The auxiliary member is surrounded by the shaft and may be provided substantially longitudinally within the shaft. Alternatively, the auxiliary member may be exterior to the shaft and may either be provided substantially longitudinally on the shaft, in a spiral configuration on the shaft, or in a braid-type configuration on the shaft. Further, the auxiliary member may be provided in a groove along the shaft or in an indentation along the shaft. The groove or the indentation may be provided substantially longitudinally along the shaft, in a spiral configuration along the shaft, or in a braid-type configuration along the shaft. The auxiliary member may be positioned substantially within the groove or within the indentation such that an outermost exposed surface of the auxiliary member lies flush with an adjacent exposed surface of the shaft. When utilizing the braid-type groove or indentation, the auxiliary member may be positioned substantially within the groove or within the indentation such that an exterior diameter of the auxiliary member is substantially equal to an exterior diameter of an adjacent exposed portion of the shaft.

The auxiliary member is secured to the shaft at at least a first portion of the shaft and at at least a second portion of the shaft, wherein the second portion of the shaft is located closer to the second end than the first portion of the shaft. The auxiliary member may be secured to the shaft at one or more additional portions of the shaft which are in the vicinity of the first portion of the shaft. The first portion of the shaft and the one or more additional portions of the shaft are preferably circumferentially distributed about the shaft. The auxiliary member may be secured to the shaft at one or more further portions of the shaft which are in the vicinity of the second portion of the shaft. The second portion of the shaft and the one or more further portions of the shaft are preferably circumferentially distributed about the shaft. The first portion of the shaft may be located on the head or the longitudinal portion of the shaft.

The auxiliary member may comprise at least one item selected from the group consisting of cable, rope, strap, cord, bar, chain, wire, sleeve, and combinations thereof. When the auxiliary member is selected in the form of a cable, the cable may comprise a material selected from the group consisting of a metal, fiber, Plexiglas, rubber, plastic, leather, and combinations thereof. The cable may be multi-braided and may be flexible. When the auxiliary member is selected in the form of a sleeve, the sleeve may comprise a material selected from the group consisting of a metal, fiber, Plexiglas, rubber, plastic, leather, and combinations thereof. The sleeve may be in mesh form and may be flexible. The sleeve surrounds the shaft and may completely or only partially longitudinally extend along the shaft. The sleeve may be positioned along a reduced-diameter section of the shaft such that an exterior diameter of the sleeve is substantially equal to an exterior diameter of an adjacent exposed portion of the shaft.

The auxiliary member may be secured to the shaft at the at least two portions of the shaft by at least one securing element selected from the group consisting of a crimp, weld, rivet, high press, glue, epoxy, adhesive, solder, and combinations thereof. The at least one securing element may be circumferentially distributed about the shaft.

The shaft may comprise a material selected from the group consisting of metal, Teflon, wood, ceramic, hardened clay, fiber, Plexiglas, glass, stone, rubber, wax, plastic, and combinations thereof. The shaft may be in the form of a nail, screw, bolt, spike, pin, brad, tack, or the like.

At least one deformation may be provided along the shaft between the first portion of the shaft and the second portion of the shaft. The at least one deformation may be selected from the group consisting of a groove, notch, cut, indentation, perforation, tear, crimp, and combinations thereof. The at least one deformation may be circumferentially distributed about the shaft. Alternatively, the at least one deformation may comprise a reduced-diameter section circumferentially distributed about the shaft.

The present invention is also directed to a method for manufacturing a fastener of the types described above. The method comprises providing a shaft having a first end and a second end, wherein the first end comprises a head. The method also comprises securing an auxiliary member to the shaft at at least two portions of the shaft.

BRIEF DESCRIPTION OF THE DRAWINGS

For the present invention to be clearly understood and readily practiced, the present invention will be described in conjunction with the following figures, wherein.

DETAILED DESCRIPTION OF THE PREFERRED EMBODIMENTS

Figure 1:
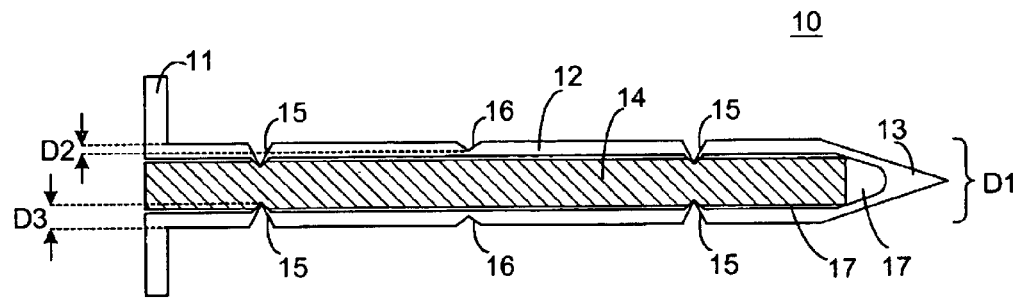
FIG. 1 is a cross-sectional side view of a nail that includes an auxiliary member secured interiorly within the shaft, in accordance with a preferred embodiment of the present invention.

It is to be understood that the figures and descriptions of the present invention may have been simplified to illustrate elements that are relevant for a clear understanding of the present invention, while eliminating, for purposes of clarity, other elements found in a typical fastener. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Referring to FIG. 1, there is shown a cross-sectional side view of a nail 10 having a shaft 12. The shaft 12 includes a first end which comprises a head 11, and a second end which comprises a tip 13. The shaft 12 may comprise any suitable material such as, for example, metal, Teflon, wood, ceramic, hardened clay, fiber, Plexiglas, glass, stone, rubber, wax, plastic, or combinations thereof. In a preferred embodiment, the shaft 12 comprises a metal. The nail 10 may ultimately be the individual (loose) type or it may be the type which is to be employed in nail guns. If intended for nail guns, the nail 10 would optionally be employed in collated or cartridge form.

Figure 2:
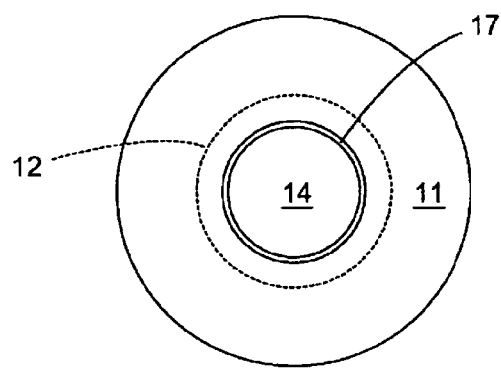
FIG. 2 is a plan view of the head of the nail shown in FIG. 1.

The nail 10 includes an elongated auxiliary member 14 secured interiorly within a longitudinal space 17 within the shaft 12. The longitudinal space 17 runs the full length of the shaft 12 or only partially. FIG. 2 illustrates a plan view of the head 11 of the nail 10 shown in FIG. 1. The auxiliary member 14 is preferably centrally positioned within the longitudinal space 17 within the shaft 12 of the nail 10. In an alternative embodiment the auxiliary member 14 may be abutted against one side of the interior surface of the shaft 12 or instead, the auxiliary member 14 may be abutted against the entire interior surface of the shaft 12 thereby eliminating longitudinal space 17.

Figure 3:
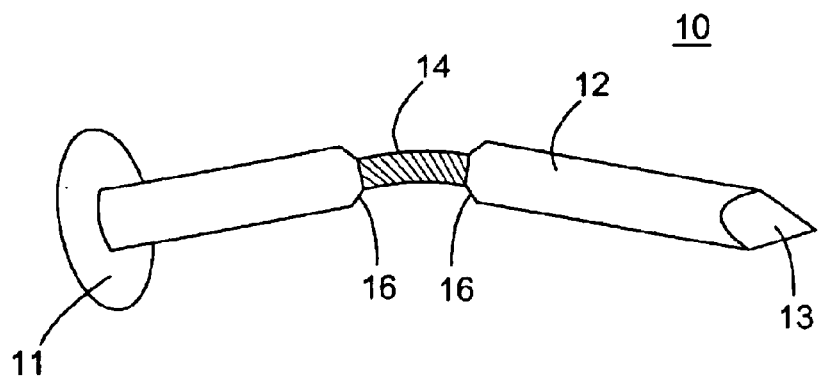
FIG. 3 is a side view of the nail shown in FIG. 1 (i.e. without illustration of crimps) which has suffered a break of the shaft.

The auxiliary member 14 is preferably sufficiently flexible and pliable such that, upon breakage or shearing of the shaft 12 (see FIG. 3), retention of the previously solidly fastened materials is maintained, but in a less stressed configuration. This retention capability would prevent the previously solidly fastened materials from coming completely disengaged (e.g. from the targeted wall of a house or building, or from the targeted framing elements in the construction of framed buildings) thereby avoiding complete separation of the once-solidly fastened materials. Upon adverse conditions, and upon breakage or shearing of the shaft 12, the auxiliary member 14 is able to absorb energy (i.e. derived from the adverse conditions) to thereby enable a high tear-out strength.

Figure 4:
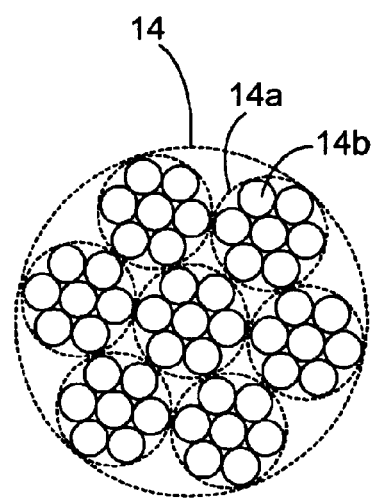
FIG. 4 is a cross-sectional view of the auxiliary member shown in FIG. 1.

The auxiliary member 14 may comprise a cable, rope, strap, cord, bar, chain, wire, sleeve, or combinations thereof. In a preferred embodiment, the auxiliary member 14 comprises a cable, or more preferably, a multi-braided cable. The cable, either in single or multi-braided form, may comprise a material such as, for example, metal, fiber, Plexiglas, rubber, plastic, leather, or combinations thereof. In a preferred embodiment, the cable comprises seven braids 14a (see FIG. 4). Each braid 14a comprises seven individual wires 14b. Alternatively, the number of braids 14a within the cable may be varied dependent on the strength and/or flexibility of the auxiliary member 14 desired. Also, the number of wires 14b within each braid 14a may be varied dependent on the strength and/or flexibility of the auxiliary member 14 desired.

The auxiliary member 14 is fixedly secured to the interior surface of the shaft 12 at at least a first portion of the shaft 12 and at at least a second portion of the shaft 12, wherein the second portion of the shaft 12 is located closer to the tip 13 of the second end than the first portion of the shaft 12. In a preferred embodiment, the auxiliary member 14 is secured to the shaft 12 at one or more additional portions of the shaft 12 which are in the vicinity of the first portion of the shaft 12. The first portion of the shaft 12 and the one or more additional portions of the shaft 12 are preferably circumferentially distributed about the shaft 12. The auxiliary member 14 may additionally be secured to the shaft 12 at one or more further portions of the shaft 12 which are in the vicinity of the second portion of the shaft 12. The second portion of the shaft 12 and the one or more further portions of the shaft 12 are preferably circumferentially distributed about the shaft 12.

Figure 16:
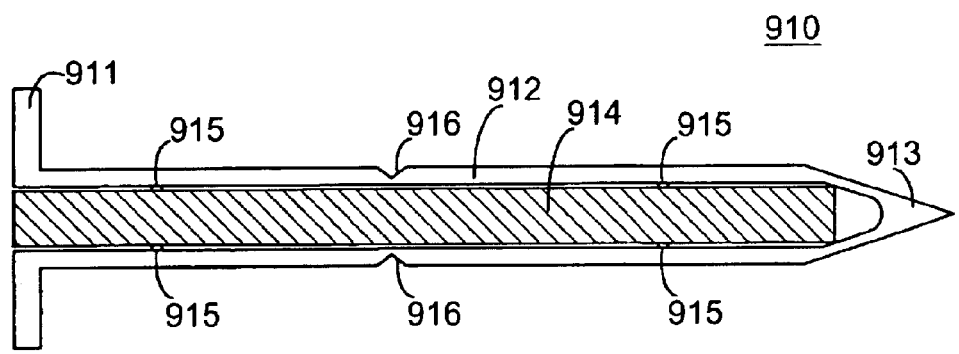
FIG. 16 is a cross-sectional side view of a nail that includes an auxiliary member secured interiorly within the shaft similar to the nail shown in FIG. 1 while replacing the crimps illustrated in FIG. 1 with another type of securing element such as, for example, weld, glue, epoxy, adhesive, solder, or combinations thereof, in accordance with a preferred embodiment of the present invention.

The securing of the auxiliary member 14 to the interior surface of the shaft 12 is performed by securing elements 15. The securing elements 15 comprise, for example, a crimp, weld, rivet, high press, glue, epoxy, adhesive, solder, or combinations thereof. In a preferred embodiment, the securing elements 15 are comprised of crimps, weld, or silver type solder. When two or more securing elements 15 are provided at either or both of the first or second portions of the shaft 12, the securing elements 15 are preferably circumferentially distributed about the shaft 12 at the respective first and/or second portions of the shaft 12. While FIG. 1 illustrates each securing element 15 as a crimp, FIG. 16 illustrates each securing element 915 as either a weld, glue, epoxy, adhesive, solder, or combinations thereof. The embodiment depicted in FIG. 16 also illustrates a nail 910 that includes an auxiliary member 914 secured interiorly within the shaft 912. Deformations 916 in the form of, for example, notches (explained below with respect to FIG. 1) are provided along the shaft 912.

In instances where facilitation of breakage (or shearing) of the shaft 12 is desired (i.e. when separation of the fastened materials is imminent and/or when separation of the fastened materials is desired at a particular location along the shaft 12), it may be preferable to provide at least one deformation 16 along the shaft 12 between the first portion of the shaft 12 and the second portion of the shaft 12. The at least one deformation 16 comprises, for example, a groove, notch, cut, indentation, perforation, tear, crimp, or combinations thereof, and is preferably circumferentially distributed about the shaft 12. In a preferred embodiment, the at least one deformation comprises a reduced-diameter section circumferentially distributed about the shaft 12. When the shaft 12 is subject to any type of high tensile and/or shear forces (e.g. during conditions of sustained high winds or high wind gusts, or during vibrations resulting from an earthquake), the shaft 12 will break at the deformations 16 thereby allowing the auxiliary member 14 to function as the sole retainer of the materials. The once-rigidly fastened materials will be retained in a less stressed form thereby avoiding total separation of the materials.

The pre-emptive utilization of the at least one deformation 16 along the shaft 12 may also be advantageous in instances where the particular location of the breakage of the shaft 12 is desired or critical. For example, when nail 10 is utilized to fasten 1 inch thick sheathing to a housing wall, the at least one deformation 16 is preferably positioned at a longitudinal location along the shaft 12 such that breakage thereof will occur just outside the vicinity of the part of the shaft 12 which binds or carries the sheathing. In other words, in this instance, the location of the at least one deformation 16 is preferably positioned 1-inch or more measured from the head 11 of the nail 10. In this configuration, the breakage of the shaft 12 will allow the sheathing to still be retained. That is, the sheathing will not snap off entirely, but rather, will be retained in a less stressed form along the housing wall by utilization of the auxiliary member 14.

In an exemplary embodiment, a #10-type metal nail which is 3 inches long and is 0.15 inch in diameter (see thickness D1 in FIG. 1) measured at the shaft is provided. The deformation (i.e. in the form of a score which is cut 0.015 inch deep—see depth D2 in FIG. 1) is made ⅝ inch below the head to accommodate ⅝ inch thick sheathing.

The nail incorporates a multi-braided cable which has an overall diameter of 0.095 inch with a working load capacity of 450 pounds. The multi-braided cable comprises seven braids each of which has a diameter of 0.03 inch. Each of the seven braids comprises seven wires each of which has a diameter of 0.01 inch. The shaft has a 0.03 inch wall thickness between the exterior and interior surfaces.

The nail may be made from tubing with a cable inserted therein. The tubing (shaft) is high pressed at one end to form the nail's tip. In this configuration, the cable would then be crimped within the tubing by an additional high pressing applied to the tubing's exterior surface. The depth of the crimp may be 0.03 inch (see depth D3 in FIG. 1). In an alternative process, the tubing, along with the cable therein, is high pressed together at one end to form the nail's tip while simultaneously fixedly securing the cable (i.e. at one end thereof) within the tubing. The nail's head may be formed with a punch-forming die. The cable is also crimped within the tubing at a location which is longitudinally below the head.

For mass manufacturing, the nails would preferably be made using a casting technique. Casting of the nail would involve pouring metal around a mold. The mold would incorporate one section or a plurality of sections which would ultimately shape the shaft (i.e. including the head and tip). The mold would be configured to allow for a hollow interior within the shaft (and head) to be effected.

In an alternative process, the head may be formed in a separate casting process and then affixed to the shaft by techniques which are well known to those skilled in the nail manufacturing area. For the embodiment shown in FIGS. 1 and 2, a central bore (leading to longitudinal space 17) would be provided during casting of the head to allow for the placement of the cable. If a solid head (i.e. without a central bore) were made from the separate casting process, the central bore may subsequently be provided by drilling, cutting or perforating the head.

Another alternative process for manufacturing the nail involves utilizing an common off-the-shelf solid-type nail.

The solid-type nail would be held in a vise or any device to prevent movement of the nail. A drill may be used to create the longitudinal space within the shaft. The drill bit may enter the shaft either on the side of the head or the side of the tip. The drill may pass completely through the entire shaft portion (i.e. including through the head and tip), or may pass partially though the shaft. The cable is subsequently inserted into the longitudinal space through either the head or the tip, and may be fixedly secured in place by securing elements 15 which are described above. If solder is chosen as the type of securing element, it may be provided at an exterior portion of the head and/or an exterior portion of the tip (i.e. exterior to the longitudinal space in both instances). As an alternative to the drill bit performing the rotation in the process of forming the longitudinal space, the nail may instead be placed on a lathe to enable turning thereof whilst forming the longitudinal space.

Figure 5:
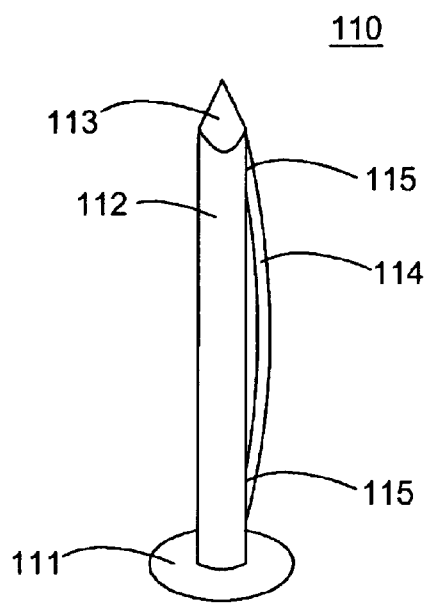
FIG. 5 is a side view of a nail that includes an auxiliary member secured exteriorly to the shaft, in accordance with a preferred embodiment of the present invention.

FIG. 5 illustrates another embodiment as an alternative to that described in FIGS. 1–4 wherein a side view of a nail 110 is depicted. The nail 110 is of solid-type and includes an auxiliary member 114 secured exteriorly to the shaft 112 in a substantially longitudinal direction. The auxiliary member 114 may be secured to the shaft 112 using a securing element 115 at each end of the auxiliary member 114 thereby allowing for a gap to be provided between a central portion of the auxiliary member 114 and the exterior surface of the shaft 112. Alternatively, the auxiliary member 114 may be secured to the shaft 112 along the entire length (or majority of the length) of the auxiliary member 114 thereby eliminating any gap between a central portion of the auxiliary member 114 and the exterior surface of the shaft 112. The auxiliary member 114 and securing elements 115 may be of the types described above in conjunction with the embodiment of FIGS. 1–4.

Figure 6:
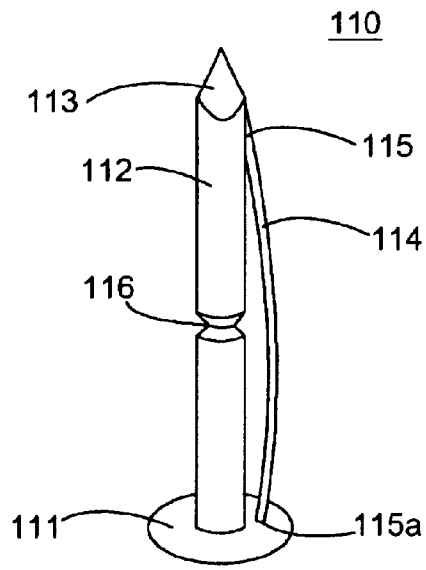
FIG. 6 is a side view of a nail that includes an auxiliary member secured exteriorly to the shaft and that includes a reduced-diameter circumferential groove provided along the shaft, in accordance with a preferred embodiment of the present invention.

FIG. 6 illustrates yet another embodiment of a nail 110 that includes an auxiliary member 114 secured exteriorly to the shaft 112 as per FIG. 5. However, the nail 110 depicted in FIG. 6 includes a deformation 116 in the form of a reduced-diameter circumferential groove provided along the shaft. The securing element 115a closest to the head 111 is affixed to the head 111 itself instead of the shaft 112. The deformation 116, auxiliary member 114, and securing elements 115, 115a may be of the types described above in conjunction with the embodiment of FIGS. 1–4.

Figure 7:
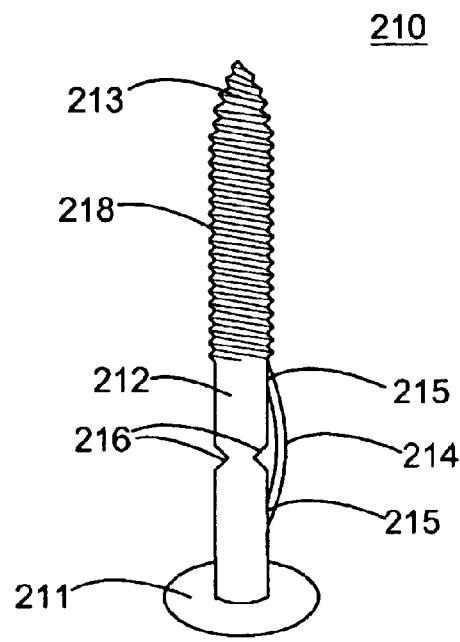
FIG. 7 is a side view of a screw that includes an auxiliary member secured exteriorly to the shaft and that includes notches provided along the shaft, in accordance with a preferred embodiment of the present invention.

FIG. 7 illustrates an embodiment comprising a solid-type screw 210 that includes an auxiliary member 214 secured exteriorly to the shaft 212 and that includes a deformation 216 in the form of notches provided along the shaft 212. The securing element 215 located closer to the tip 213 is provided adjacent the threads 218 of the screw 210. The deformation 216, auxiliary member 214, and securing elements 215 may be of the types described above in conjunction with the embodiments of FIGS. 1–4 and 6.

Figure 8:
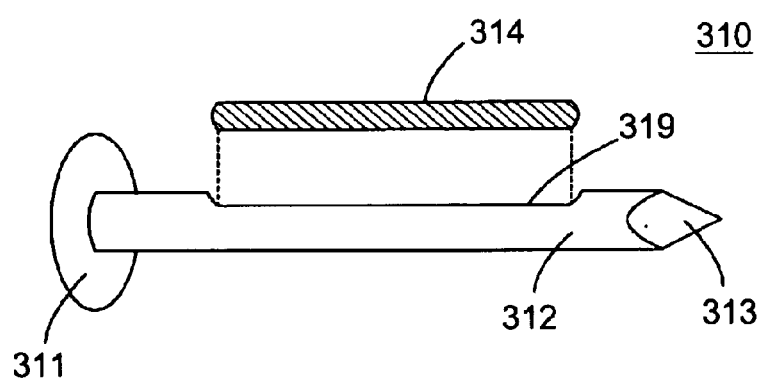
FIG. 8 is an exploded side view of a nail that includes an auxiliary member secured in a longitudinal groove or longitudinal indentation along the shaft, in accordance with a preferred embodiment of the present invention.
Figure 9:
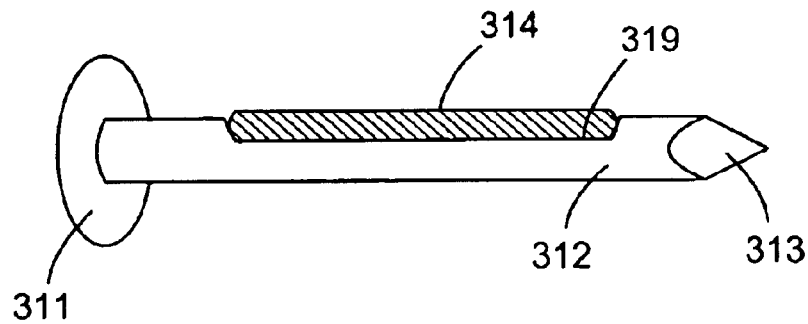
FIG. 9 is a non-exploded side view of the nail shown in FIG. 8.
Figure 10:
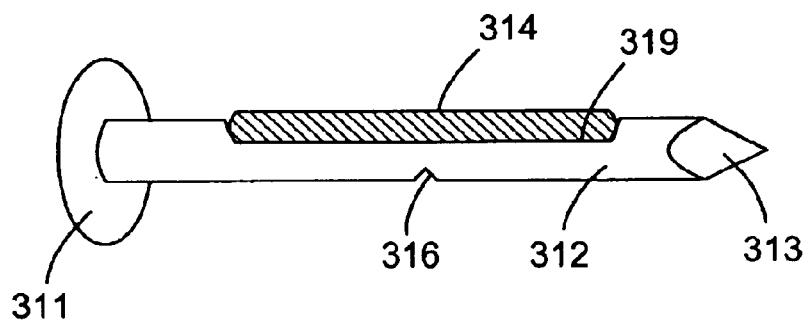
FIG. 10 is a non-exploded side view of the nail shown in FIG. 8 further including a notch provided along the shaft.

FIG. 8 illustrates yet another embodiment wherein an exploded side view of a solid-type nail 310 is depicted. The nail 310 includes an auxiliary member 314 secured in a groove or indentation 319 along the shaft 312. The groove or indentation 319 extends partially or completely along the shaft 312 in a substantially longitudinal direction. The auxiliary member 314 lies within the groove or indentation 319 and is affixed thereto by securing elements of the type described above in conjunction with the embodiments of FIGS. 1–7. The groove or indentation 319 may be provided during casting of the shaft 312. Alternatively, a shaft may be formed (e.g. cast) without the groove or indentation 319. A groove, notch, cut, indentation, perforation, tear, crimp, or combinations would subsequently be provided along the shaft 312. FIG. 9 illustrates a non-exploded side view of the nail 310 shown in FIG. 8. FIG. 10 illustrates a non-exploded side view of the nail 310 shown in FIG. 8 further including a deformation 316 in the form of a notch provided along the shaft 312. The deformation 316 (in FIG. 10) and auxiliary member 314 (in FIGS. 8–10) may be of the types described above in conjunction with the embodiments of FIGS. 1–4, 6, and 7.

In an alternative embodiment, the auxiliary member 314 may lie substantially within the groove or indentation 319 such that the outermost exposed surface of the auxiliary member 314 lies flush with the adjacent exposed surface of the shaft 312 (i.e. the adjacent surface of the shaft 312 that does not include the auxiliary member 314 thereon). This configuration facilitates less resistance during driving of the nail into a targeted element.

Figure 11:
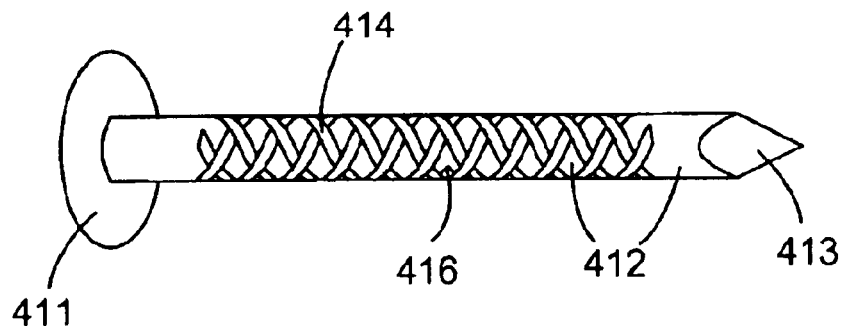
FIG. 11 is a side view of a nail that includes an auxiliary member that surrounds the shaft in a braid-type configuration, in accordance with a preferred embodiment of the present invention.

FIG. 11 illustrates yet another embodiment of a nail 410 which is similar in configuration to that described above in conjunction with the embodiments of FIGS. 5, 6, and 8–10. However, the nail 410 depicted in FIG. 11 includes an auxiliary member 414 that surrounds the shaft 412 in a braid-type configuration. The auxiliary member 414 extends partially or completely longitudinally along the shaft 412. The auxiliary member 414 lies on the shaft 412 and is affixed thereto by securing elements of the type described above in conjunction with the embodiments of FIGS. 1–10. The securing elements are preferably located at opposite end portions of the auxiliary member.

In this exemplary embodiment, the nail may be manufactured using off-the-shelf components. The nail (i.e. without the braid-type auxiliary member 414) may be a commercial #10-type metal nail. The braid-type auxiliary member 414 may be the type of braided wire material which typically surrounds shielded electrical wire. Braided wire material of this type is typically composed of stainless steel. A wire manufacturer may preferably supply the braided wire material itself (i.e. without the electrical wire therewithin) in roll/spindle form. The braided wire material may then be cut to a predetermined length and affixed to the shaft 412 by welding at opposite ends of the cut, braided wire material.

Alternatively, the auxiliary member 414 may instead be secured in a groove or indentation along the shaft 412 wherein the groove or indentation is provided in a corresponding braid-type configuration along the shaft 412. The braid-type groove or braid-type indentation extends partially or completely longitudinally along the shaft 412. The auxiliary member 414 lies within the groove or indentation and is affixed thereto by securing elements of the type described above in conjunction with the embodiments of FIGS. 1–10. The auxiliary member 414 may lie substantially within the groove or indentation such that the exterior diameter of the auxiliary member 414 is substantially equal to the exterior diameter of the adjacent exposed portion of the shaft 412 (i.e. the adjacent portion of the shaft 412 that does not include the auxiliary member 414 thereon). In other words, the exterior surface of the auxiliary member 414 lies flush with the adjacent exposed surface of the shaft 412. This configuration facilitates less resistance during driving of the nail into a targeted element.

The braid-type groove or braid-type indentation may be formed by similar techniques which are described above in conjunction with the embodiments of FIGS. 8–10. The deformation 416 may be of the type described above in conjunction with the embodiments of FIGS. 1–4, 6, 7, and 10. The structure and composition of the braid-type auxiliary member 414 may be of the type described above in conjunction with the embodiments of FIGS. 1–10. For example, the braid-type auxiliary member 414 may be composed of interweaving cables. Each of the interweaving cables may comprise individual or braided fibers. Note that the term "fibers" in this embodiment as well as throughout the description may include, but is not limited to, fibers of carbon-type and nylon-type.

Figure 12:
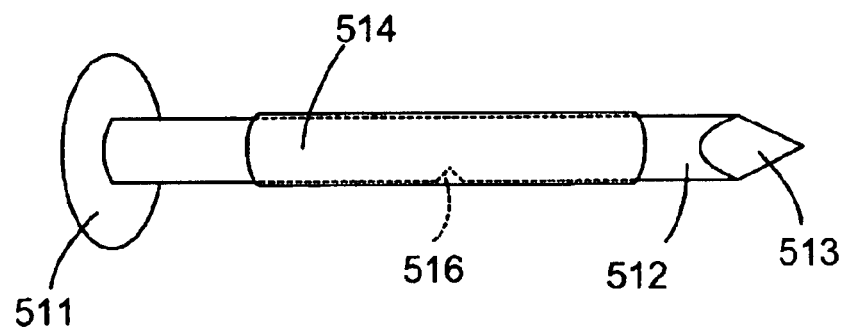
FIG. 12 is a side view of a nail that includes an auxiliary member that surrounds the shaft in a sleeve configuration, in accordance with a preferred embodiment of the present invention.

FIG. 12 illustrates a further embodiment of a nail 510 which is similar in configuration to that described above in conjunction with the embodiments of FIGS. 5, 6, and 8–11. However, the nail 510 depicted in FIG. 12 includes an auxiliary member 514 that surrounds the shaft 512 in a sleeve configuration. The auxiliary member 514 is preferably in the form of a mesh, but may alternatively be in solid form. The auxiliary member 514 (even in mesh form) may be comprised of, e.g. metal, fiber, Plexiglas, rubber, plastic, leather, or combinations thereof. The auxiliary member 514 is preferably sufficiently flexible and pliable as per the embodiments above and extends either partially or completely along the shaft 512 in a longitudinal direction. The auxiliary member 514 lies on the shaft 512 and is affixed thereto by securing elements of the type described above in conjunction with the embodiments of FIGS. 1–11. The deformation 516 may be of the type described above in conjunction with the embodiments of FIGS. 1–4, 6, 7, 10, and 11.

In an alternative embodiment, the sleeve-type auxiliary member 514 may lie exteriorly to (i.e. surrounding) the shaft 512 along a reduced-diameter section of the shaft 512 such that the exterior diameter of the auxiliary member 514 is substantially equal to the exterior diameter of the adjacent exposed portion of the shaft 512 (i.e. the adjacent portion of the shaft 512 that does not include the auxiliary member 514 thereon). In other words, the exterior surface of the auxiliary member 514 lies flush with the adjacent exposed surface of the shaft 512. This configuration facilitates less resistance during driving of the nail into a targeted element.

As another alternative embodiment, the sleeve-type auxiliary member 514 may be positioned within a longitudinal space provided within the shaft 512. In this configuration, the sleeve-type auxiliary member 514 may be affixed to the interior surface of the shaft 512 using similar techniques as that described above in conjunction with the embodiment of FIGS. 1–4.

The composition of the shaft for each of the nails in the embodiments of FIGS. 5–12 may be of the type described above in conjunction with the embodiment of FIGS. 1–4.

Figure 13:
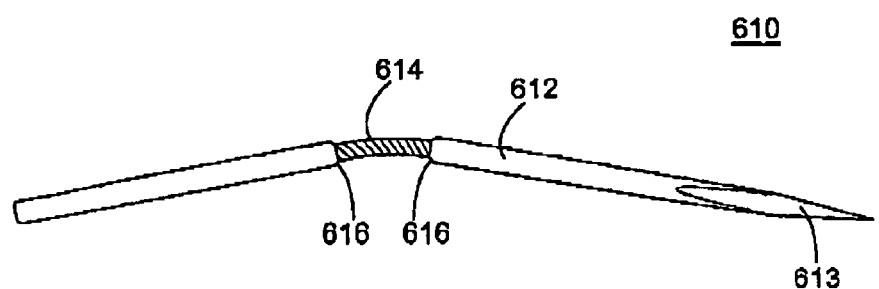
FIG. 13 is a side view of a pin that includes an auxiliary member secured interiorly within the shaft, in accordance with a preferred embodiment of the present invention.
Figure 14:
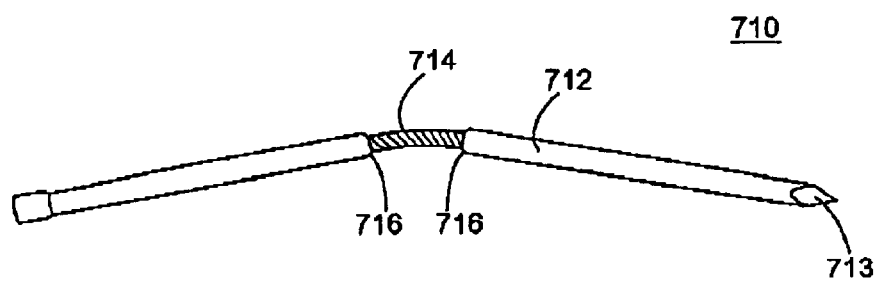
FIG. 14 is a side view of a brad that includes an auxiliary member secured interiorly within the shaft, in accordance with a preferred embodiment of the present invention.
Figure 15:
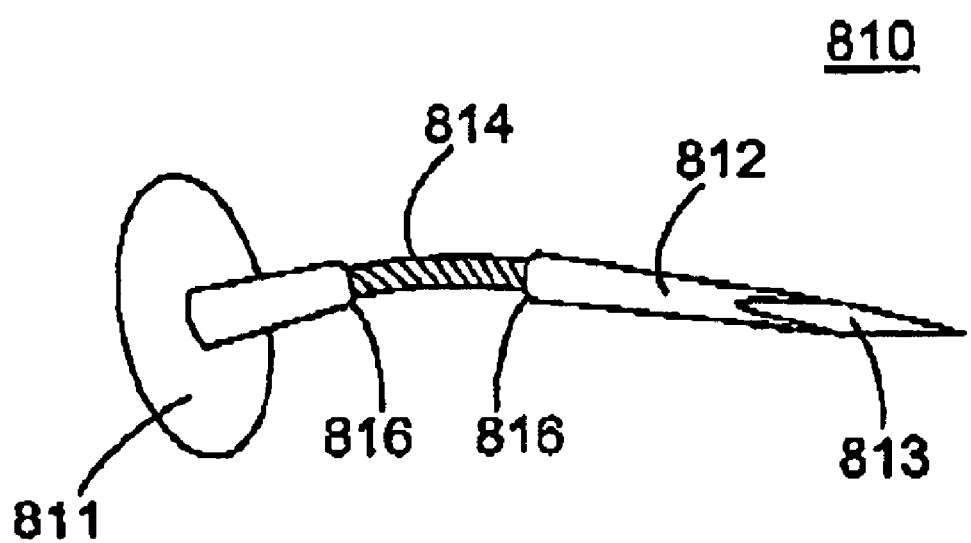
FIG. 15 is a side view of a tack that includes an auxiliary member secured interiorly within the shaft, in accordance with a preferred embodiment of the present invention.
Figure 17:
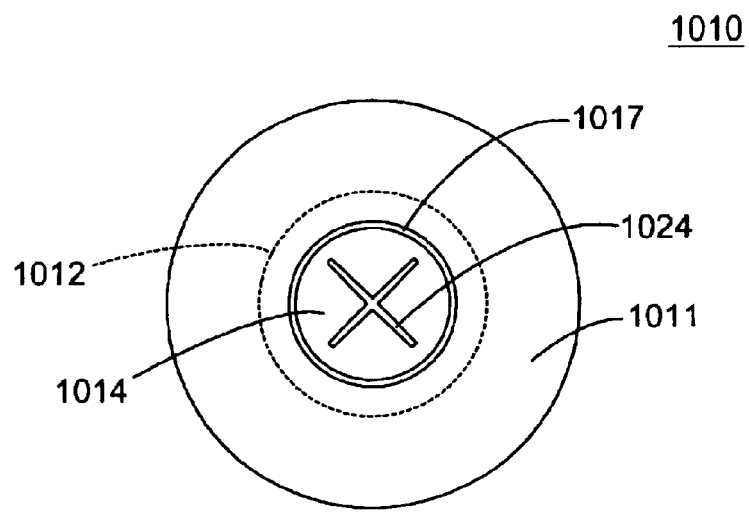
FIG. 17 is a plan view of the head of a screw that includes an auxiliary member secured interiorly within the shaft, wherein the auxiliary member is provided with a philips head-type configuration at the end of the auxiliary member adjacent the head, in accordance with a preferred embodiment of the present invention.

Those of ordinary skill in the art will recognize that various modifications and variations may be made to the embodiments described above without departing from the spirit and scope of the present invention. For example, although the embodiments above describe aspects of the invention in conjunction with a nail-type fastener, other fasteners such as, for example, a screw, bolt, spike, pin, brad, tack, etc., may also be contemplated. FIGS. 13–15 illustrate embodiments comprising a pin 610, brad 710, and tack 810, respectively, that include an auxiliary member 614, 714, 814 secured interiorly within the shaft 612, 712, 812 and that include a deformation 616, 716, 816 in the form of notches provided along the shaft 612, 712, 812. The fastener may also be configured in various dimensions (e.g. thicknesses, sizes, and lengths) dependent on the strength, flexibility, and/or breakage or shearing threshold desired of the fastener. Also, the fastener described in conjunction with FIGS. 1–4 may alternatively be configured as a screw. This configuration may then preferably employ an auxiliary member which is provided with a Philips head-type or a traditional slot-type configuration at the end adjacent the head for applying a screwdriver to the screw. FIG. 17 illustrates a plan view of the head 1011 of a screw 1010 (i.e. without illustration of threads on the shaft 1012) that includes an auxiliary member 1014 secured interiorly within the shaft 1012, wherein the auxiliary member 1014 is provided with a philips head-type configuration 1024 at the end of the auxiliary member 1014 adjacent the head 1011. Further, each of the embodiments described above may alternatively employ an auxiliary member which is stiff or rigid (i.e. not flexible or pliable). In this configuration, the auxiliary member would provide supplemental strength to the fastener. Breakage or shearing of the shaft would not be desired in this instance. The fastener may alternatively employ two or more auxiliary members. Further, each of the embodiments described above may employ aspects taken from other embodiments. For example, one end (i.e. closest to the head 411) of the spiral-type auxiliary member 414 in FIG. 11 may be affixed to the head 411 itself as per the embodiment shown in FIG. 6 (i.e. using securing element 115a). It is therefore to be understood that the present invention is not limited to the particular embodiments disclosed above, but it is intended to cover such modifications and variations as defined by the following claims.

What is claimed is:

1. A fastener comprising:
    a shaft having a longitudinal axis, wherein the shaft includes a first end and a second end, wherein the first end comprises a head; and
    a flexible auxiliary member positioned substantially longitudinally within the shaft such that the auxiliary member resides in a cavity within the shaft, wherein the cavity has a central longitudinal axis, and wherein the auxiliary member occupies space within the cavity along at least a portion of the central longitudinal axis;
    wherein the auxiliary member is secured to the shaft at at least a first portion of the shaft and at at least a second portion of the shaft, wherein the second portion of the shaft is located closer to the second end than the first portion of the shaft, wherein the shaft is a unitary structure at least between the first portion of the shaft and the second portion of the shaft, and wherein the auxiliary member is free from securement to the shaft at at least one location which is between the first portion of the shaft and the second portion of the shaft.

2. The fastener of claim 1, wherein the auxiliary member is secured to the shaft at one or more additional portions of the shaft which are in the vicinity of the first portion of the shaft.

3. The fastener of claim 2, wherein the first portion of the shaft and the one or more additional portions of the shaft are circumferentially distributed about the shaft.

4. The fastener of claim 1, wherein the auxiliary member is secured to the shaft at one or more further portions of the shaft which are in the vicinity of the second portion of the shaft.

5. The fastener of claim 4, wherein the second portion of the shaft and the one or more further portions of the shaft are circumferentially distributed about the shaft.

6. The fastener of claim 1, wherein the first portion of the shaft is located at the head.

7. The fastener of claim 1, wherein the auxiliary member comprises at least one item selected from the group consisting of cable, rope, strap, cord, bar, chain, wire, and combinations thereof.

8. The fastener of claim 1, wherein the auxiliary member is a cable.

9. The fastener of claim 8, wherein the cable comprises a material selected from the group consisting of a metal, fiber, Plexiglas, rubber, plastic, leather, and combinations thereof.

10. The fastener of claim 8, wherein the cable comprises a metal.

11. The fastener of claim 8, wherein the cable is multi-braided.

12. The fastener of claim 1, wherein the auxiliary member is secured to the shaft at the first portion of the shaft and the second portion of the shaft by at least one securing element selected from the group consisting of a crimp, weld, rivet, high press, glue, epoxy, adhesive, solder, and combinations thereof.

13. The fastener of claim 12, wherein the at least one securing element is circumferentially distributed about the shaft.

14. The fastener of claim 1, wherein the auxiliary member is secured to the shaft at at least one of the first portion of the shaft and the second portion of the shaft by at least one crimp.

15. The fastener of claim 14, wherein the at least one crimp is a plurality of crimps circumferentially distributed about the shaft.

16. The fastener of claim 1, wherein the auxiliary member is secured to the shaft at the first portion of the shaft and the second portion of the shaft by at least one securing element selected from the group consisting of a weld, glue, epoxy, adhesive, solder, and combinations thereof.

17. The fastener of claim 16, wherein the at least one securing element is circumferentially distributed about the shaft.

18. The fastener of claim 1, wherein an outer surface of the auxiliary member is abutted against an inner surface of the shaft while the auxiliary member is secured to the shaft at the first portion of the shaft and the second portion of the shaft.

19. The fastener of claim 1, wherein the shaft comprises a material selected from the group consisting of metal, Teflon, wood, ceramic, hardened clay, fiber, Plexiglas, glass, stone, rubber, wax, plastic, and combinations thereof.

20. The fastener of claim 1, wherein the shaft comprises a metal.

21. The fastener of claim 1, wherein the shaft, between the first end and the second end, defines a nail exteriorly.

22. The fastener of claim 1, wherein the shaft, between the first end and the second end, defines a screw exteriorly.

23. The fastener of claim 22, wherein the auxiliary member comprises either a philips head configuration or a traditional slot configuration at an end of the auxiliary member adjacent the head.

24. The fastener of claim 1, wherein the shaft, between the first end and the second end, defines a bolt exteriorly.

25. The fastener of claim 1, wherein the shaft, between the first end and the second end, defines a spike exteriorly.

26. The fastener of claim 1, wherein the shaft, between the first end and the second end, defines a pin exteriorly.

27. The fastener of claim 1, wherein the shaft, between the first end and the second end, defines a brad exteriorly.

28. The fastener of claim 1, wherein the shaft, between the first end and the second end, defines a tack exteriorly.

29. The fastener of claim 1, wherein at least one deformation is provided along the shaft between the first portion of the shaft and the second portion of the shaft.

30. The fastener of claim 29, wherein the at least one deformation is selected from the group consisting of a groove, notch, cut, indentation, perforation, tear, crimp, and combinations thereof.

31. The fastener of claim 29, wherein the at least one deformation is circumferentially distributed about the shaft.

32. The fastener of claim 29, wherein the at least one deformation comprises a reduced-diameter section circumferentially distributed about the shaft.

33. The fastener of claim 1, wherein at least one deformation is provided along the shaft at the at least one location.

34. A method for manufacturing a fastener, the method comprising:
providing a shaft having a longitudinal axis, wherein the shaft includes a first end and a second end, wherein the first end comprises a head; and
providing a flexible auxiliary member substantially longitudinally within the shaft such that the auxiliary member resides in a cavity within the shaft, wherein the cavity has a central longitudinal axis, and wherein the auxiliary member occupies space within the cavity along at least a portion of the central longitudinal axis;
securing the auxiliary member to the shaft at at least a first portion of the shaft and at at least a second portion of the shaft, wherein the second portion of the shaft is located closer to the second end than the first portion of the shaft, wherein the shaft is a unitary structure at least between the first portion of the shaft and the second portion of the shaft, and wherein the auxiliary member is free from securement to the shaft at at least one location which is between the first portion of the shaft and the second portion of the shaft.

35. The method of claim 34, wherein the auxiliary member is a cable.

36. The method of claim 34, wherein the auxiliary member is secured to the shaft at at least one of the first portion of the shaft and the second portion of the shaft via crimping.

37. The method of claim 34, wherein the auxiliary member is secured to the shaft at the first portion of the shaft and the second portion of the shaft by at least one securing element selected from the group consisting of a weld, glue, epoxy, adhesive, solder, and combinations thereof.

38. The method of claim 34, wherein the shaft, between the first end and the second end, defines a nail exteriorly.

39. The method of claim 34, wherein the shaft, between the first end and the second end, defines a screw exteriorly.

40. The method of claim 39, wherein the auxiliary member comprises either a philips head configuration or a traditional slot configuration at an end of the auxiliary member adjacent the head.

41. A fastener comprising:
a shaft having a longitudinal axis, wherein the shaft includes a first end and a second end, wherein the first end comprises a head; and
a flexible auxiliary member positioned substantially longitudinally within the shaft such that the auxiliary member resides in a cavity within the shaft, wherein the cavity is defined by an inner surface of the shaft;
wherein the auxiliary member includes an outer surface which is secured to the inner surface of the shaft at at least a first portion of the shaft and at at least a second portion of the shaft, wherein the second portion of the shaft is located closer to the second end than the first portion of the shaft, wherein the shaft is a unitary structure at least between the first portion of the shaft and the second portion of the shaft, and wherein the auxiliary member is free from securement to the shaft at at least one location which is between the first portion of the shaft and the second portion of the shaft.

42. The fastener of claim 41, wherein the auxiliary member is secured to the shaft at one or more additional portions of the shaft which are in the vicinity of the first portion of the shaft.

43. The fastener of claim 42, wherein the first portion of the shaft and the one or more additional portions of the shaft are circumferentially distributed about the shaft.

44. The fastener of claim 41, wherein the auxiliary member is secured to the shaft at one or more further portions of the shaft which are in the vicinity of the second portion of the shaft.

45. The fastener of claim 44, wherein the second portion of the shaft and the one or more further portions of the shaft are circumferentially distributed about the shaft.

46. The fastener of claim 41, wherein the first portion of the shaft is located at the head.

47. The fastener of claim 41, wherein the auxiliary member comprises at least one item selected from the group consisting of cable, rope, strap, cord, bar, chain, wire, sleeve, and combinations thereof.

48. The fastener of claim 41, wherein the auxiliary member is a cable.

49. The fastener of claim 48, wherein the cable comprises a material selected from the group consisting of a metal, fiber, Plexiglas, rubber, plastic, leather, and combinations thereof.

50. The fastener of claim 48, wherein the cable comprises a metal.

51. The fastener of claim 48, wherein the cable is multi-braided.

52. The fastener of claim 41, wherein the auxiliary member is a sleeve.

53. The fastener of claim 52, wherein the sleeve comprises a material selected from the group consisting of a metal, fiber, Plexiglas, rubber, plastic, leather, and combinations thereof.

54. The fastener of claim 52, wherein the sleeve is in mesh form.

55. The fastener of claim 41, wherein the auxiliary member is secured to the shaft at the first portion of the shaft and the second portion of the shaft by at least one securing element selected from the group consisting of a crimp, weld, rivet, high press, glue, epoxy, adhesive, solder, and combinations thereof.

56. The fastener of claim 55, wherein the at least one securing element is circumferentially distributed about the shaft.

57. The fastener of claim 41, wherein the auxiliary member is secured to the shaft at at least one of the first portion of the shaft and the second portion of the shaft by at least one crimp.

58. The fastener of claim 57, wherein the at least one crimp is a plurality of crimps circumferentially distributed about the shaft.

59. The fastener of claim 41, wherein the auxiliary member is secured to the shaft at the first portion of the shaft and the second portion of the shaft by at least one securing element selected from the group consisting of a weld, glue, epoxy, adhesive, solder, and combinations thereof.

60. The fastener of claim 59, wherein the at least one securing element is circumferentially distributed about the shaft.

61. The fastener of claim 41, wherein the outer surface of the auxiliary member is abutted against the inner surface of the shaft while the auxiliary member is secured to the shaft at the first portion of the shaft and the second portion of the shaft.

62. The fastener of claim 41, wherein the shaft comprises a material selected from the group consisting of metal, Teflon, wood, ceramic, hardened clay, fiber, Plexiglas, glass, stone, rubber, wax, plastic, and combinations thereof.

63. The fastener of claim 41, wherein the shaft comprises a metal.

64. The fastener of claim 41, wherein the shaft, between the first end and the second end, defines a nail exteriorly.

65. The fastener of claim 41, wherein the shaft, between the first end and the second end, defines a screw exteriorly.

66. The fastener of claim 65, wherein the auxiliary member comprises either a philips head configuration or a traditional slot configuration at an end of the auxiliary member adjacent the head.

67. The fastener of claim 41, wherein the shaft, between the first end and the second end, defines a bolt exteriorly.

68. The fastener of claim 41, wherein the shaft, between the first end and the second end, defines a spike exteriorly.

69. The fastener of claim 41, wherein the shaft, between the first end and the second end, defines a pin exteriorly.

70. The fastener of claim 41, wherein the shaft, between the first end and the second end, defines a brad exteriorly.

71. The fastener of claim 41, wherein the shaft, between the first end and the second end, defines a tack exteriorly.

72. The fastener of claim 41, wherein at least one deformation is provided along the shaft between the first portion of the shaft and the second portion of the shaft.

73. The fastener of claim 72, wherein the at least one deformation is selected from the group consisting of a groove, notch, cut, indentation, perforation, tear, crimp, and combinations thereof.

74. The fastener of claim 72, wherein the at least one deformation is circumferentially distributed about the shaft.

75. The fastener of claim 72, wherein the at least one deformation comprises a reduced-diameter section circumferentially distributed about the shaft.

76. The fastener of claim 41, wherein at least one deformation is provided along the shaft at the at least one location.

77. A method for manufacturing a fastener, the method comprising:
   providing a shaft having a longitudinal axis, wherein the shaft includes a first end and a second end, wherein the first end comprises a head; and
   providing a flexible auxiliary member substantially longitudinally within the shaft such that the auxiliary member resides in a cavity within the shaft, wherein the cavity is defined by an inner surface of the shaft;
   securing an outer surface of the auxiliary member to the inner surface of the shaft at at least a first portion of the shaft and at at least a second portion of the shaft, wherein the second portion of the shaft is located closer to the second end than the first portion of the shaft, wherein the shaft is a unitary structure at least between the first portion of the shaft and the second portion of the shaft, and wherein the auxiliary member is free from securement to the shaft at at least one location which is between the first portion of the shaft and the second portion of the shaft.

78. The method of claim 77, wherein the auxiliary member is a cable.

79. The method of claim 77, wherein the auxiliary member is secured to the shaft at at least one of the first portion of the shaft and the second portion of the shaft via crimping.

80. The method of claim 77, wherein the auxiliary member is secured to the shaft at the first portion of the shaft and the second portion of the shaft by at least one securing element selected from the group consisting of a weld, glue, epoxy, adhesive, solder, and combinations thereof.

81. The method of claim 77, wherein the shaft, between the first end and the second end, defines a nail exteriorly.

82. The method of claim 77, wherein the shaft, between the first end and the second end, defines a screw exteriorly.

83. The method of claim 82, wherein the auxiliary member comprises either a philips head configuration or a traditional slot configuration at an end of the auxiliary member adjacent the head.

84. A fastener comprising:
   a shaft having a longitudinal axis, wherein the shaft includes a first end and a second end, wherein the first end comprises a head, wherein the shaft includes a cavity positioned longitudinally therein, and wherein the cavity has a central longitudinal axis; and
   a flexible auxiliary member positioned longitudinally within the cavity such that the auxiliary member occupies space within the cavity along at least a portion of the central longitudinal axis;
   wherein the auxiliary member is secured to the shaft at at least a first portion of the shaft and at at least a second portion of the shaft, wherein the second portion of the shaft is located closer to the second end than the first portion of the shaft, wherein the shaft is a unitary structure at least between the first portion of the shaft and the second portion of the shaft, and wherein the auxiliary member is free from securement to the shaft at at least one location which is between the first portion of the shaft and the second portion of the shaft.

85. The fastener of claim 84, wherein the auxiliary member is a cable.

86. The fastener of claim 84, wherein the auxiliary member is secured to the shaft at at least one of the first portion of the shaft and the second portion of the shaft by at least one crimp.

87. The fastener of claim 84, wherein the auxiliary member is secured to the shaft at the first portion of the shaft and the second portion of the shaft by at least one securing element selected from the group consisting of a weld, glue, epoxy, adhesive, solder, and combinations thereof.

88. The fastener of claim 84, wherein the shaft, between the first end and the second end, defines a nail exteriorly.

89. The fastener of claim 84, wherein the shaft, between the first end and the second end, defines a screw exteriorly.

90. The fastener of claim 89, wherein the auxiliary member comprises either a philips head configuration or a traditional slot configuration at an end of the auxiliary member adjacent the head.

91. A method for manufacturing a fastener, the method comprising:

providing a shaft having a longitudinal axis, wherein the shaft includes a first end and a second end, wherein the first end comprises a head, wherein the shaft includes a cavity positioned longitudinally therein, and wherein the cavity has a central longitudinal axis; and providing a flexible auxiliary member substantially longitudinally within the cavity such that the auxiliary member occupies space within the cavity along at least a portion of the central longitudinal axis;

securing the auxiliary member to the shaft at at least a first portion of the shaft and at at least a second portion of the shaft, wherein the second portion of the shaft is located closer to the second end than the first portion of the shaft, wherein the shaft is a unitary structure at least between the first portion of the shaft and the second portion of the shaft, and wherein the auxiliary member is free from securement to the shaft at at least one location which is between the first portion of the shaft and the second portion of the shaft.

92. A fastener comprising:

a shaft having a longitudinal axis, wherein the shaft includes a first end and a second end, wherein the first end comprises a head, wherein the shaft includes a cavity positioned longitudinally therein, and wherein the shaft includes an inner surface which defines the cavity; and a flexible auxiliary member positioned longitudinally within the cavity;

wherein the auxiliary member includes an outer surface which is secured to the inner surface of the shaft at at least a first portion of the shaft and at at least a second portion of the shaft, wherein the second portion of the shaft is located closer to the second end than the first portion of the shaft, wherein the shaft is a unitary structure at least between the first portion of the shaft and the second portion of the shaft, and wherein the auxiliary member is free from securement to the shaft at at least one location which is between the first portion of the shaft and the second portion of the shaft.

93. The fastener of claim 92, wherein the auxiliary member is a cable.

94. The fastener of claim 92, wherein the auxiliary member is secured to the shaft at at least one of the first portion of the shaft and the second portion of the shaft by at least one crimp.

95. The fastener of claim 92, wherein the auxiliary member is secured to the shaft at the first portion of the shaft and the second portion of the shaft by at least one securing element selected from the group consisting of a weld, glue, epoxy, adhesive, solder, and combinations thereof.

96. The fastener of claim 92, wherein the shaft, between the first end and the second end, defines a nail exteriorly.

97. The fastener of claim 92, wherein the shaft, between the first end and the second end, defines a screw exteriorly.

98. The fastener of claim 97, wherein the auxiliary member comprises either a philips head configuration or a traditional slot configuration at an end of the auxiliary member adjacent the head.

99. A method for manufacturing a fastener, the method comprising:

providing a shaft having a longitudinal axis, wherein the shaft includes a first end and a second end, wherein the first end comprises a head, wherein the shaft includes a cavity positioned longitudinally therein, and wherein the shaft includes an inner surface which defines the cavity; and providing a flexible auxiliary member longitudinally within the cavity;

securing an outer surface of the auxiliary member to the inner surface of the shaft at at least a first portion of the shaft and at at least a second portion of the shaft, wherein the second portion of the shaft is located closer to the second end than the first portion of the shaft, wherein the shaft is a unitary structure at least between the first portion of the shaft and the second portion of the shaft, and wherein the auxiliary member is free from securement to the shaft at at least one location which is between the first portion of the shaft and the second portion of the shaft.

* * * * *